Jan. 29, 1952     J. E. HAWKINS ET AL     2,583,839

CAP CONNECTING BOX

Filed May 27, 1949     2 SHEETS—SHEET 1

INVENTORS
James E. Hawkins
Robert S. Finn
BY Mason, Kolehmainen, Rathburn & Wyss
Attys.

Jan. 29, 1952  J. E. HAWKINS ET AL  2,583,839
CAP CONNECTING BOX
Filed May 27, 1949  2 SHEETS—SHEET 2
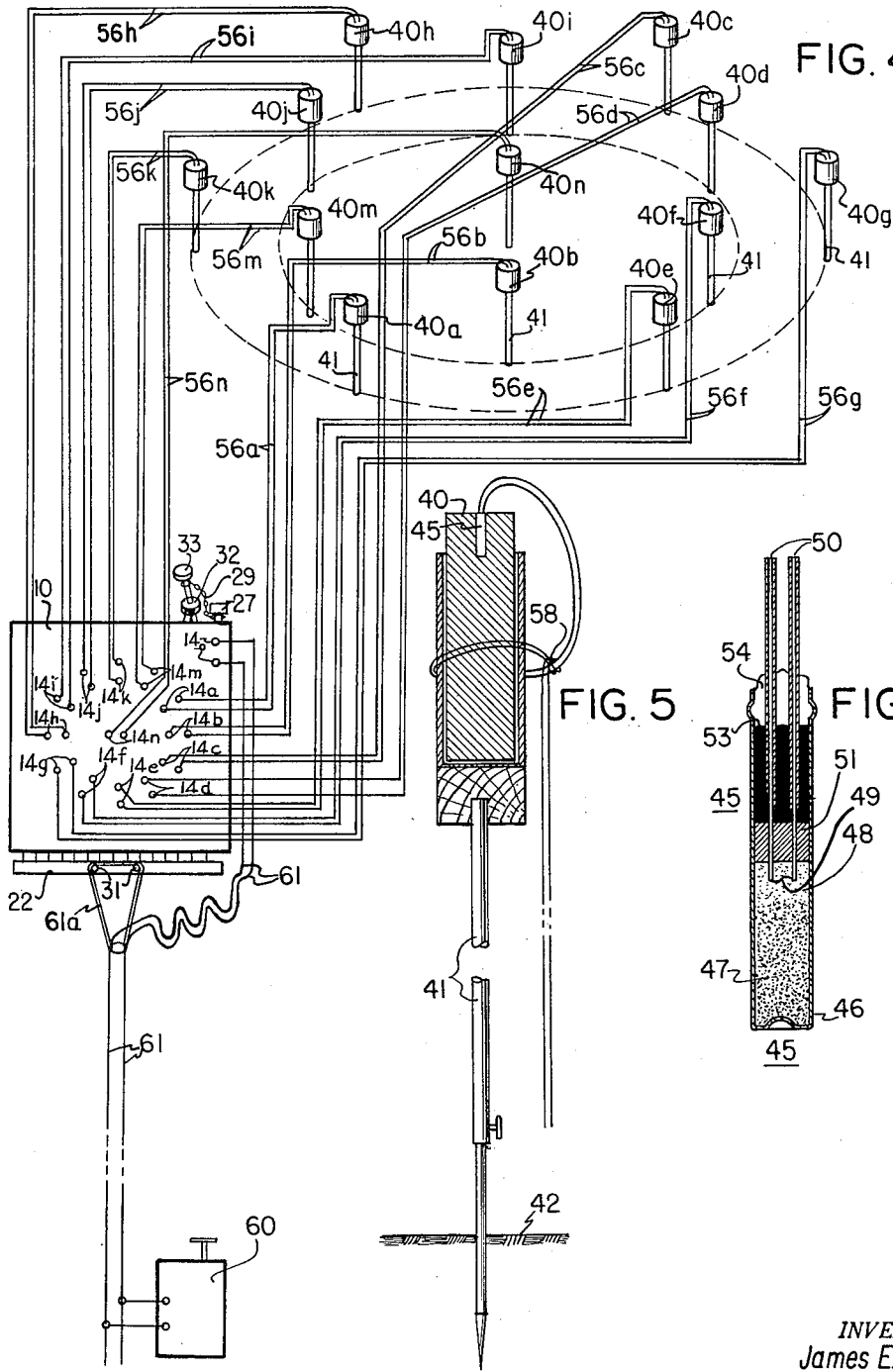
INVENTORS
James E. Hawkins
Robert S. Finn
BY Mason, Kolehmainen, Rathburn & Wyss
Attys.

Patented Jan. 29, 1952

2,583,839

UNITED STATES PATENT OFFICE 2,583,839

CAP CONNECTING BOX

James E. Hawkins and Robert S. Finn, Tulsa, Okla., assignors to Seismograph Service Corporation, Tulsa, Okla., a corporation of Delaware Application May 27, 1949, Serial No. 95,834

7 Claims. (Cl. 175—115)

This invention relates to a cap connecting box and more particularly to a safety device or apparatus for simplifying the making of electrical connections in a blasting circuit for simultaneously detonating a plurality of spaced charges as well as greatly increasing the safety factor.

In various applications it has become desirable simultaneously to detonate a plurality of explosive charges disposed in spaced relationship so that each charge requires a separate blasting cap. In geophysical prospecting, for example, one extensively used emthod comprises the creation of seismic waves in the earth for the purpose of recording reflections and refractions of these waves from various interfaces beneath the earth's crust whereby it is possible to determine certain characteristics of the subsurface strata which are pertinent for example in locating oil deposits. The most satisfactory way of creating such seismic waves is by the detonation of explosive charges either beneath the earth's surface, on the earth's surface or above the earth's surface. Sometimes a single large explosive charge is detonated in a certain place and subsequent charges are detonated at predetermined different places at successive times in order to obtain information with respect to seismic waves which can be correlated and from which an analysis of the subsurface strata can be made. In other applications it is desirable to detonate a plurality of spaced charges for the creation of seismic waves or for other purposes. One such application is disclosed in co-pending Hawkins application, Serial No. 70,075 filed January 10, 1949 and assigned to the same assignee as the present application. In that copending application an arrangement is disclosed for generating seismic waves above the surface of the earth thereby saving the cost of drilling shot holes in which the explosive charges are deposited.

Perhaps the most commonly used method of detonating explosives, particularly for seismic prospecting, comprises employing a blasting cap for each charge which cap has a bridge wire embedded in a priming charge. The flow of an electric current through the bridge wire fires the cap and consequently detonates the associated exp'osive charge. Where simultaneous detonation of a plurality of spaced charges is desired the blasting caps are all connected in series with a suitable source of electrical energy such as a battery or a blasting generator. The flow of current through the bridge wires causes simultaneous detonation of all the spaced explosive charges.

It will be understood that during the time that the blasting generator and the caps are connected in series there exists the possibility of inadvertent explosion of the charges. It would be desirable to provide an arrangement which is fairly foolproof and which would minimize the possibility of inadvertent explosion of the charges to be detonated and yet permit the simultaneous detonation of these charges at the desired time.

Accordingly it is an object of the present invention to provide a new and improved connecting means for use in simultaneously detonating a plurality of spaced charges and capable of minimizing inadvertent detonation of such charges.

It is another object of the present invention to provide a new and improved cap connecting box adapted to permit ready series connection of a plurality of blasting caps and a blasting generator, and including means for preventing inadvertent operation of the blasting generator from detonating the caps even though all electrical connections are completed.

Further objects and advantages of the present invention will become apparent as the following description proceeds, and the features of novelty which characterize the invention will be pointed out with particularity in the claims annexed to and forming a part of this specification.

For a better understanding of the present invention reference may be had to the accompanying drawings in which:

Fig. 4 is a schematic diagram of a representative blasting circuit embodying the cap connecting box of the present invention to illustrate a specific application thereof;

Fig. 5 is an enlarged view of one of the blasting charges shown schematically in Fig. 4 to illustrate the cap position and electrical connection of the cap leads; and Fig. 6 is an enlarged sectional view of a representative blasting cap employed in connection with the present invention.

Figure 1:
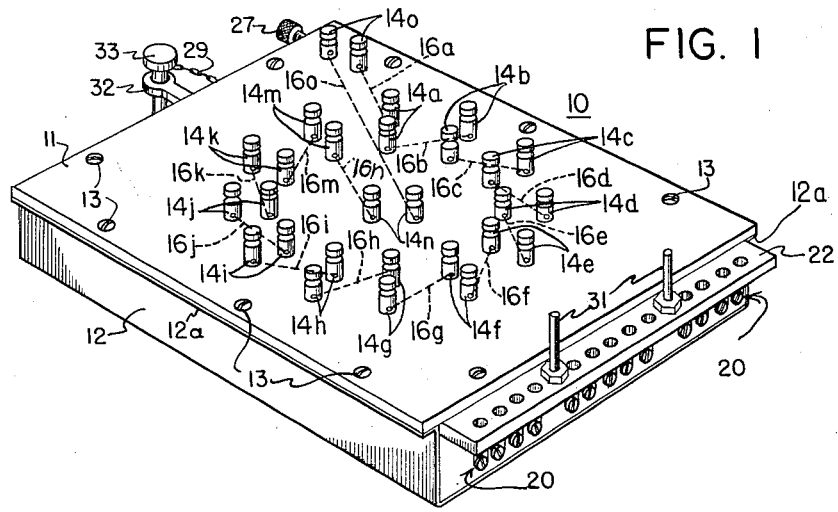
Fig. 1 is a perspective view of a cap connecting box embodying the present invention.

The cap connecting box of the present invention essentially comprises a terminal board provided with a plurality of pairs or sets of terminals to each pair of which, except one, the conductors leading to a different blasting cap may be connected. The said one of the pairs of terminals is adapted to be connected to a source of blasting energy such as a blasting generator, a battery or the like. The cap connecting box is provided with means for making a good ground connection and internal connections are provided whereby when the plurality of blasting caps and the blasting generator are each connected to their respective pairs of terminals on the box, the generator and all of the caps are in series circuit relationship. A multi-pole switch is provided which is normally closed to not only ground all of the terminals but also to short circuit each pair of terminals so that it is impossible to supply electrical energy to the caps even though the blasting generator is inadvertently actuated. Means are even provided to prevent static charges from adversely affecting the blasting caps. When it is desired to detonate the explosive charges the multi-pole switch is opened either electrically or mechanically through means actuated from a point near the blasting generator, and the blasting generator is then actuated to fire the caps and detonate the associated explosive charges.

Although the present invention is especially effective for use in detonating a plurality of spaced charges in connection with geophysical prospecting employing seismic waves, it will be understood by those skilled in the art that many other applications thereof are possible. Actually the present invention can advantageously be employed wherever a plurality of charges usually spaced are to be detonated simultaneously. In view of the particular advantage with reference to the creation of seismic waves by the simultaneous detonation of a plurality of spaced charges afforded by the present invention, it has been illustrated in the drawings and described in the specification in connection with such application.

Referring now to the drawings there is illustrated a cap connecting box generally designated at 10 which is especially effective to minimize accidental firing of blasting caps. This cap connecting box 10 comprises a terminal board 11 formed of insulating material and suitably mounted as a cover on a base 12 to form the boxlike structure 10. In one embodiment which was constructed the terminal board 11 was formed of plywood and the base 12 was formed of steel. The base 12 is preferably provided with lateral flanges 12a to which the terminal board 11 may be fastened as by screws or similar fastening means 13. Mounted on the terminal board 11 are a plurality of sets or pairs of terminals designated as 14 and specifically comprising pairs of terminals 14a, 14b, 14c, 14d, 14e, 14f, 14g, 14h, 14i, 14j, 14k, 14m, 14n and 14o. Each pair of terminals 14, except for one set, is adapted to be connected to a pair of cap leads or wires leading to a conventional blasting cap. The said one set of terminals are adapted to be connected to a conventional firing line described in greater detail hereinafter to which suitable blast initiating means such as a blasting generator are connected. As illustrated, fourteen pairs of terminals 14 are provided whereby thirteen separate blasting charges may be simultaneously detonated, the fourteenth set being connected to the blasting generator.

Figure 3:
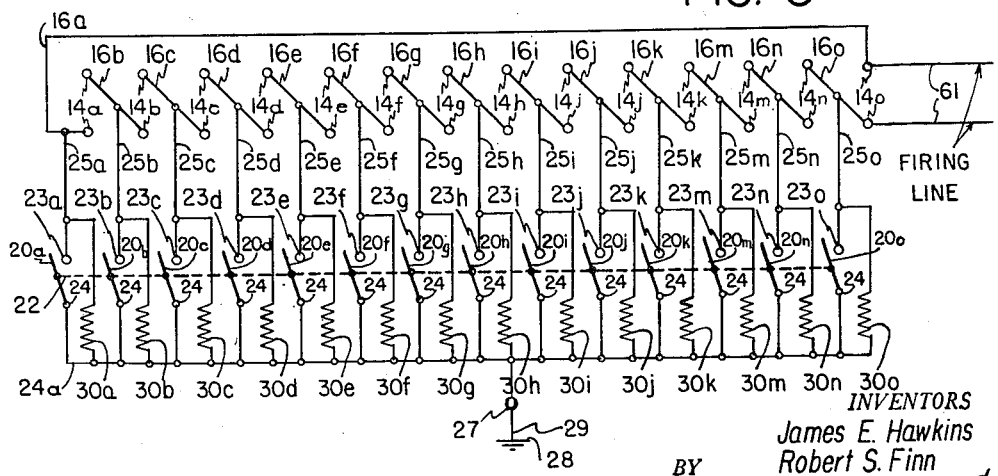
Fig. 3 is a schematic circuit diagram of the electrical circuit embodied in the cap connecting box of Fig. 1 and showing in addition the completed ground connection.

In order that the blasting caps and blasting generator may be serially arranged when connected to the various pairs of terminals 14, a plurality of relatively heavy bus wires 16 are provided which are disposed on the underside of the terminal board 11 within the box defined by the members 11 and 12. As illustrated these heavy bus wires are specifically designated as 16a, 16b, 16c, 16d, 16e, 16f, 16g, 16h, 16i, 16j, 16k, 16m, 16n and 16o. The bus wire 16a as is best shown in the schematic circuit diagram of Fig. 3 interconnects one of the pair of firing line terminals 14o with one of the pair of terminals 14a. Similarly the bus wire 16b interconnects the other of the pair of terminals 14a with one of the pair of terminals 14b. The bus wire 16c connects the other of the pair of terminals 14b with one of the pair of terminals 14c, etc. The bus wire 16n connects one of the pair of terminals 14m with one of the pair of terminals 14n. The bus wire 16o, connects the other of the pair of terminals 14n with the other of the firing line terminals 14o.

Figure 2:
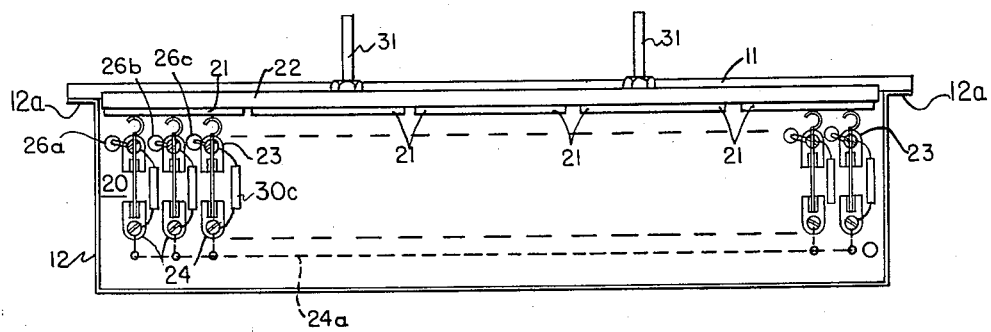
Fig. 2 is an end view partially in section of the cap connecting box of Fig. 1 showing some of the details of a multipole grounding and short circuting switch associated therewith.

To normally short circuit the terminals 14 except when it is desired to detonate the charges there is provided a multipole switch generally designated at 20 comprising a plurality of parallel disposed switch blades or poles designated as 20a, 20b, 20c, 20d, 20e, 20f, 20g, 20h, 20i, 20j, 20k, 20m, 20n, and 20o. These switch blades are of the so-called "knife blade" type hinged at one end. As illustrated in Fig. 2 of the drawings, a plurality of three pole knife blade type switches are mounted on one end of the cap connecting box with each of the insulating blade connecting bars 21 arranged for gang operation by being suitably connected to a gang bar 22. In the closed position of the switch shown in Fig. 2 of the drawings the parallel switch blades 20 are each adapted to engage a cooperating stationary contact 23 specifically designated as 23a, 23b, 23c, 23d, 23e, 23f, 23g, 23h, 23i, 23j, 23k, 23m, 23n, and 23o. The multi-pole switch 20 is a single throw switch and the pivoted ends of the individual blades are hinged to terminals 24 which are all connected in parallel by a common connection generally designated at 24a in Figs. 2 and 3 of the drawings.

Each of the stationary switch contacts 23 is connected to a different one of the bus wires 16 by means of one of a plurality of conductors 25. The conductors 25, which are preferably insulated conductors, are disposed within the boxlike chamber defined by the members 11 and 12 and the ends thereof connected to the contacts 23 extend through suitable openings 26 in the box 10 adjacent these contacts. As illustrated the bus wire 16a is connected to the switch terminal 23a by means of a conductor 25a, which extends outside the boxlike chamber through the opening 26a. Similarly the bus wires 16b, 16c, etc., are respectively connected to the stationary switch terminals 23b, 23c, etc., by means of insulated conductors or wires 25b, 25c, etc., respectively. When the multi-pole switch 20 is in the closed position it will be apparent from an examination of Fig. 3 of the drawings that all of the pairs of terminals 14 are short circuited so that if a firing line is connected to the terminals 14o and caps are connected to the terminals 14a, 14b, 14c, etc., that such short circuiting of the terminals will prevent energization of the bridge wires in the caps and consequently prevent detonation of the explosive charges associated with the caps. As a further safety measure the cap connecting box includes a grounding terminal 27, indicated as being disposed at the end of the box opposite the switch 20, to which the common conductor 24a is connected. As schematically illustrated the ground terminal 27 may readily be connected to ground 28 by means of a grounding lead 29.

For the purpose of preventing the accumulation of static charges on the leads to the individual blasting caps which are connected to the respective pairs of terminals 14, the switch blades 20 are paralleled by resistors 30 specifically designated as 30a, 30b, 30c, 30d, 30e, 30f, 30g, 30h, 30i, 30j, 30k, 30m, 30n and 30o. Preferably these resistors 30 have a resistance of the order of one megohm and are permanently connected across the switch blades so that even when the multi-pole switch 20 is in the open position shown in Fig. 3 of the drawings a high resistance ground circuit is provided from each of the blasting cap terminals 14 as well as the terminals 14o of the firing line, thereby preventing the accumulation of static charges.

In accordance with the present invention the multi-pole switch 20 is opened just prior to energization of the blasting circuit. To accomplish this the multi-pole switch is provided with a pair of hook members 31 to which a loop in the firing line may be attached. The switch 20 may be actuated by a jerk on the firing line whereupon the blasting circuit is in condition for detonation of the explosives since the short circuit ground connection of each blasting cap and the blasting generator is removed and only the high resistance ground circuit through the resistors 30 remains. It will be understood that the switch 20 might be electrically actuated by a suitable solenoid associated therewith. A switch located adjacent the blasting generator might be closed to energize such solenoid to open the switch 20 in the same manner as if it were pulled open by applying a force to the firing line.

In view of the fact that it is desirable for the cap connecting box 10 to be a relatively light device for portability, it will be understood that without additional means a jerk on the firing line to actuate the switch 20 might cause bodily movement of the cap connecting box 10. Accordingly on the end of the box 10 opposite the switch 20 there is provided a ground ring 32 attached to the box 10 in any suitable manner. This ring is adapted to receive a stake 33 (Fig. 4) driven into the ground to retain the box against movement when opening the switch 20 in response to a jerk on the firing line. Preferably the stake 33 driven into the ground through the ring 32 also provides the electrical ground connection and is connected to the terminal 27 by means of the ground lead 29.

For a better understanding of the operation of the cap connecting box 10, reference may be had to Figs. 4, 5 and 6 of the drawings where a specific application of the present invention is schematically shown. In Fig. 4 of the drawings a plurality of charges 40 are illustrated as being mounted on suitable stakes 41 driven into the ground designated at 42 in Fig. 5 of the drawings. The stakes 41 and consequently the charges 40 are arranged in a predetermined pattern over an area of the earth's surface 42 to create seismic waves having specific characteristics such as is disclosed in the above referred to Hawkins application. These stakes 41 are preferably designed so as suitably to support the charges 40 as is best shown in Fig. 5 of the drawings. Disposed in each of the charges 40 is a suitable blasting cap 45 shown greatly enlarged in Fig. 6 of the drawings. This blasting cap 45 is illustrated as of standard construction which may readily be purchased on the market. By way of making a complete disclosure each cap 45 is illustrated as comprising a suitable shell or container 46 having adjacent the bottom thereof a pressed charge 47 above which is disposed a primer charge 48. A suitable bridge wire 49 is embedded in the primer charge and the ends of the bridge wire are connected to the ends of a pair of insulated wires 50 extending outside the casing or shell 46. A suitable plug 51 is disposed in the shell 46 immediately above the primer charge 48 through which the wires 50 extend, and the upper portion of the shell is filled with a water proof filler or compound 53. Preferably the top of the cap is sealed by a suitable cement 54. If desired the cap 45 may be provided with a shorting connector which normally shorts the two cap leads 50 and which shorting means must be removed prior to the blasting operation. This shorting means is not disclosed but may comprise a shorting ring which is readily removable or a foil type shorting connector which is also readily removable.

For the purpose of illustrating the blasting circuit connections, each of the explosive charges 40 is designated by a suitable subscript corresponding with the subscripts associated with the terminals 14 on the cap connecting board 10. As illustrated the cap 45 associated with the explosive charge 40a is connected by means of cap leads 50a with the terminals 14a on the cap connecting box 10. Similarly the other explosive charges 40 are connected by leads 50 designated by a suitable subscript to the other terminals 14 designated by identical subscripts. After the area where the explosive charges are to be detonated has been chosen the cap connecting box 10 is placed on the ground near this location but in no event closer than twenty-five feet from the charge location. If charges comprising large quantities of explosive are to be used the cap connecting box 10 should be positioned farther away than twenty-five feet. The box 10 is located so that the switch end thereof is pointing toward the direction where the shooter will stand for actuating the blasting generator. Upon proper positioning of the box 10 the ground rod 33 is inserted through the ground ring 32 and driven firmly into the earth. If the earth is dry, water is preferably poured around the rod to insure a good electrical ground connection. The ground terminal 27 on the cap connecting box 10 is then connected to the stake 33 by means of the grounding cable 29 thereby providing the necessary ground connections for the cap connecting box 10. The switch 20 is then closed. If less charges are to be detonated than the number of pairs of terminals provided on the cap connecting box 10, those pairs of terminals 14 which are not to be used must be interconnected by suitable conductors so as to complete the series connection.

The cap connecting box 10 is now ready for connection to the respective caps 45 associated with the charges 40. The cap leads 56 are tied to the stakes 41 as indicated at 58 in Fig. 5 of the drawings, with enough slack provided so that the cap ends may readily reach the caps 45. The other ends of the cap leads are connected to the proper terminals on the cap connecting box 10. Preferably the two cap leads should be shorted together until the actual connection with the terminals 14 is made. After this the charges 40 are made up and placed on the stakes 41 with the cap 45 properly connected to the cap leads 56.

A blasting generator 60 or other source of electrical energy for fusing the bridge wires 49 in the caps 40 is connected by means of a firing line 61 to the blasting generator terminals 14o on the box 10. A loop 61a provided on the firing line 61 is hooked over the hook members 31 associated with the gang bar 22 interconnecting the switch blades 20. As long as the switch 20 remains closed no detonation of the charges can occur. When the operator is ready to detonate the charges a pull is given to the firing line 61 thereby opening the shorting switch 20 on the cap connecting box 10 and making the circuit ready for firing. The blasting generator 60 is actuated in the conventional manner with the resultant detonation of the charges.

From the above description it will be apparent that there has been provided a simple cap connecting box which greatly minimizes accidental detonation of blasting charges and therefore provides a much safer arrangement than was heretofore available. The cap connecting box furthermore is a rather foolproof arrangement insuring proper connection of the electrical circuit even by unskilled operators.

While there has been shown and described a particular embodiment of the present invention, it is not desired that the invention be limited to the constructional details shown and described, for it will, of course, be obvious to those skilled in the art that changes and modifications may be made without departing from the invention in its broader aspects. It is therefore aimed in the appended claims to cover all such changes and modifications as fall within the true spirit and scope of the present invention.

What is claimed as new and desired to be secured by Letters Patent of the United States is:

1. A cap connecting box for connecting a source of blasting energy to a plurality of caps for detonating simultaneously a plurality of charges, comprising a terminal board, a plurality of pairs of terminals mounted on said board to which pairs of leads connected to different ones of said caps may be connected, an additional pair of terminals mounted on said board to which leads to said source of blasting energy may be connected, means on said terminal board for connecting said pairs of terminals in series when each pair of terminals has an electric circuit connected thereto, a ground terminal associated with said box, a multi-pole switch, and means including said multi-pole switch for both short circuiting each pair of said terminals and also connecting each pair of said terminals to said ground terminal thereby to prevent detonation of said caps as long as said switch is closed.

2. A cap connecting box for connecting a source of blasting energy in series with a plurality of caps for detonating simultaneously a plurality of charges, comprising a box like support including an insulating terminal board, a plurality of pairs of terminals mounted on said board to which pairs of leads connected to different ones of said caps may be connected, an additional pair of terminals on said board to which leads to said source of blasting energy may be connected, means on said terminal board for connecting said pairs of terminals in series when each pair of terminals has an electric circuit connected thereacross, a ground terminal associated with said box, a multi-pole switch mounted at one end of said box, means including said multi-pole switch for both short circuiting each pair of said terminals and also connecting each pair of said terminals to said ground terminal thereby to prevent detonation of said caps as long as said switch is closed, and means mounted at the other end of said box for holding said box against movement while applying a force to open said switch.

3. A cap connecting box for connecting a source of blasting energy to a plurality of caps for detonating simultaneously a plurality of charges, comprising a terminal board, a plurality of pairs of terminals mounted on said board to which pairs of leads connected to different ones of said caps may be connected, an additional pair of terminals mounted on said board to which leads to said source of blasting energy may be connected, means on said terminal board for connecting said pairs of terminals in series when each pair of terminals has an electric circuit connected thereto, a ground terminal associated with said box, a multi-pole switch, means including said multi-pole switch for both short circuiting each pair of said terminals and also connecting each pair of said terminals to said ground terminal thereby to prevent detonation of said caps as long as said switch is closed, and a higher resistor for each pair of terminals connecting each pair of terminals to said ground terminal regardless of the position of said switch to prevent the accumulation of static charges.

4. A safety device for simplifying the making of connections between a source of blasting energy and a plurality of detonating means for detonating simultaneously a plurality of charges as well as insuring against inadvertent detonation of said charges, comprising a box-like member having a terminal board as one side thereof, a plurality of pairs of terminals mounted on said board to which pairs of leads connected to different ones of said detonating means may be connected, an additional pair of terminals mounted on said board to which leads to said source of blasting energy may be connected, individual conductor means within said box like member for connecting one terminal of each said pairs of terminals to one of another of said pairs of terminals thereby to connect all said terminals in series when an external electric circuit is connected to each of said pairs of terminals, a ground terminal mounted on said box like structure, a multi-pole switch mounted on said box like structure, means for connecting one side of each pole of said multi-pole switch to said ground terminal, means for connecting the other side of each pole of said multi-pole switch to a corresponding one of said individual conductor means whereby when said switch is closed each pair of said terminals is short circuited and connected to said ground terminal, thereby to insure against inadvertent detonation of said detonating means.

5. A safety device for simplifying the making of connections between a source of blasting energy and a plurality of detonating means for detonating simultaneously a plurality of charges as well as insuring against inadvertent detonation of said charges, comprising a box like member having an insulating terminal board as the top thereof, a plurality of pairs of terminals mounted on said board to which pairs of leads connected to different ones of said detonating means may be connected, an additional pair of terminals mounted on said board to which leads to said source of blasting energy may be connected, individual conductor means within said box like member for connecting one terminal of each said pairs of terminals to one of another of said pairs of terminals thereby to connect all said terminals in series when an external electric circuit is connected to each of said pairs of terminals, a ground terminal mounted on an end of said box like structure, a multi-pole switch mounted on the other end of said box like structure, parallel conductor means for connecting one side of each pole of said multi-pole switch to said ground terminal, means for connecting the other side of each pole of said multi-pole switch to a corresponding one of said individual conductor means whereby when said switch is closed each pair of said terminals is short circuited and connected to said ground terminal, thereby to insure against inadvertent detonation of said detonating means, and individual resistors connected across each pole of said switch to prevent the accumulation of static charges.

6. A cap connecting box for connecting a source of blasting energy in series with a plurality of caps for detonating simultaneously a plurality of charges, comprising a box like support including an insulating terminal board, a plurality of pairs of terminals mounted on said board to which pairs of leads connected to different ones of said caps may be connected, an additional pair of terminals on said board to which leads to said source of blasting energy may be connected, means in said box for connecting said pairs of terminals in series when each pair of terminals has an electric circuit connected thereacross, a ground terminal associated with said box, a multi-pole switch mounted at one end of said box, means for connecting adjacent ends of each pole of said multi-pole switch to said grounding terminal means for connecting the other ends of each pole of said switch to one terminal of a different one of said pairs of terminals thereby grounding and short circuiting each of said pairs of terminals to prevent detonation of said caps as long as said switch is closed, a grounding ring connected to the other end of said box for holding said box against movement while applying a force to open said switch.

7. A cap connecting box for connecting a source of blasting energy in series with a plurality of caps for detonating simultaneously a plurality of charges, comprising a box like support including an insulating terminal board, a plurality of pairs of terminals mounted on said board to which pairs of leads connected to different ones of said caps may be connected, an additional pair of terminals on said board to which leads to said source of blasting energy may be connected, means on said terminal board for connecting said pairs of terminals in series when each pair of terminals has an electric circuit connected thereacross, a ground terminal associated with said box, a multi-pole switch mounted on said box, means including said multi-pole switch for both short circuiting each pair of said terminals and also connecting each pair of said terminals to ground thereby to prevent detonation of said caps as long as said switch is closed, and means for opening said switch.

JAMES E. HAWKINS.
ROBERT S. FINN.

REFERENCES CITED

The following references are of record in the file of this patent:

UNITED STATES PATENTS

| Number | Name | Date |
|---|---|---|
| 808,275 | Dobson | Dec. 26, 1905 |
| 1,959,479 | Kielczewski | May 22, 1934 |
| 2,044,666 | Burney | June 16, 1936 |
| 2,122,819 | Lazich | July 5, 1938 |
| 2,428,334 | Lubelsky | Sept. 30, 1947 |

FOREIGN PATENTS

| Number | Country | Date |
|---|---|---|
| 313,951 | Great Britain | May 12, 1930 |